(12) United States Patent
Riester

(10) Patent No.: US 6,763,162 B2
(45) Date of Patent: Jul. 13, 2004

(54) OPTICAL SWITCH ARRANGEMENT AND METHOD

(75) Inventor: Markus Riester, Wiesbaden (DE)

(73) Assignee: Motorola, Inc., Schaumburg, IL (US)

( * ) Notice: Subject to any disclaimer, the term of this patent is extended or adjusted under 35 U.S.C. 154(b) by 51 days.

(21) Appl. No.: 10/210,729

(22) Filed: Aug. 1, 2002

(65) Prior Publication Data

US 2004/0022480 A1 Feb. 5, 2004

(51) Int. Cl.⁷ .............................. G02B 6/26; G02B 6/42
(52) U.S. Cl. ......................................... 385/18; 385/16
(58) Field of Search ..................................... 385/16–18

(56) References Cited

U.S. PATENT DOCUMENTS

| | | | | |
|---|---|---|---|---|
| 6,009,219 A | * | 12/1999 | Doyle | 385/23 |
| 6,526,196 B1 | * | 2/2003 | Li | 385/18 |
| 6,580,849 B2 | * | 6/2003 | Chen et al. | 385/18 |
| 6,587,614 B2 | * | 7/2003 | Liao et al. | 385/18 |

OTHER PUBLICATIONS

Roland Ryf, David T. Neilson, c. Randy Giles, Scalable Micro Mechanical Optical Crossconnects, Proceedings of SPIE vol. 4455 (2001).

Optical Switching: Unravelled, FibreSystems Europe, Jun. 2000.

* cited by examiner

*Primary Examiner*—Edward J. Glick
*Assistant Examiner*—Thomas R Artman

(57) ABSTRACT

1. A rotatable mirror optical switch arrangement (100) comprising: an input array of light sources (160); an output array of light receivers (180); a first rotatable platter (110) of mirror elements arranged between the input array and the output array whereby light (140, 150) from a desired one of the input array of light sources is reflected via the rotatable platter to a desired one of the output array of light receivers dependent on rotation of the first rotatable platter. The mirror elements may be comprised in a free-form surface. The size of a single mirror may be smaller than 1 mm². A passive optical switch matrix (275) may be positioned between the input and output arrays to increase switching permutations. The mirror elements may be arranged in segments (100), which may be arranged in sectors and rings.

This provides the following advantages: lower amount of moveable parts compared with the prior art for same number of optical I/Os; high reliability due to low number of moving parts; mirrors do not move individually (no alignment/recalibration of single mirrors necessary); non-blocking switch; precision built into design.

27 Claims, 4 Drawing Sheets

OPTICAL SWITCH ARRANGEMENT AND METHOD

FIELD OF THE INVENTION

This invention relates to optical switches, and particularly, though not exclusively, to such switches for transmission of high-speed high-volume optical data over long-haul, metro and access networks.

BACKGROUND OF THE INVENTION

MEMS (Micro-Electro-Mechanical System) switch arrays up to 1156×1156 have recently begun to appear on the market. These switches are based on MEMS technology and are based on 3D-switch design. Other known switching technologies are based on, for example, Liquid Crystals, "Champagne" or Bubble Switches, Thermo-Optical Switching (see, e.g., the paper "Scalable Micro Mechanical Optical Crossconnects" by Roland Ryf, David T. Neilson, and C. Randy Giles in Proc. SPIE Vol. 4455, p. 51–58, "Micro- and Nano-Optics for Optical Interconnection and Information Processing", Editors Mohammad R. Taghizadeh, Hugo Thienpont and Ghassan E. Jabbour; and OMM Technical note: OMM 16×16 photonic switch brief, Rev. 3/02).

The objective in such switching is to attain very large arrays of switches for switching between input channels and output channels. In known state of the art optical switches, $n^2$ moveable mirrors are required, e.g. a dual gimbal design, that are moveable to $n^2-1$ different positions, n being the number of channels necessary to connect all input channels to all output channels. Independent of the technology, massive parallel switching is a challenge, both in terms of the complex manufacturing processes for the switch matrices, and in the processes required to assemble the complete optical switch.

However, state of the art known optical switches require a large number of moveable mirrors, which present a significant challenge for the manufacturing process.

A need therefore exists for an optical switch and method therefor wherein the abovementioned disadvantage(s) may be alleviated.

STATEMENT OF INVENTION

In accordance with a first aspect of the present invention there is provided a rotatable mirror optical switch arrangement comprising:

an input array of light sources;

an output array of light receivers; and a first rotatable platter of mirror elements arranged between the input array and the output array whereby light from a desired one of the input array of light sources is reflected via the rotatable platter to a desired one of the output array of light receivers dependent on rotation of the first rotatable platter.

In accordance with a second aspect of the present invention there is provided a method for rotatable mirror optical switching comprising:

providing an input array of light sources;

providing an output array of light receivers;

providing a first rotatable platter of mirror elements arranged between the input array and the output array; and transmitting light from a desired one of the input array of light sources by reflection via the rotatable platter to a desired one of the output array of light receivers dependent on rotation of the first rotatable platter.

BRIEF DESCRIPTION OF THE DRAWINGS

Three rotating disc mirror array arrangements and methods incorporating the present invention will now be described, by way of example only, with reference to the accompanying drawings, in which.

DESCRIPTION OF PREFERRED EMBODIMENTS

Figure 1:
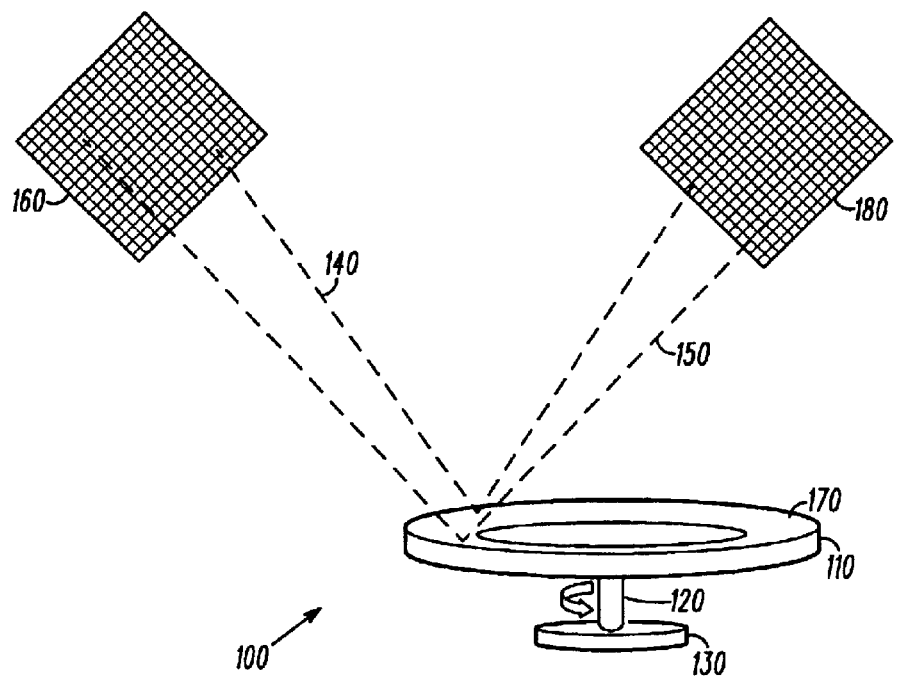
FIG. 1 shows a conceptual perspective illustration of a first optical switch arrangement based on a rotating platter.
Figure 2:
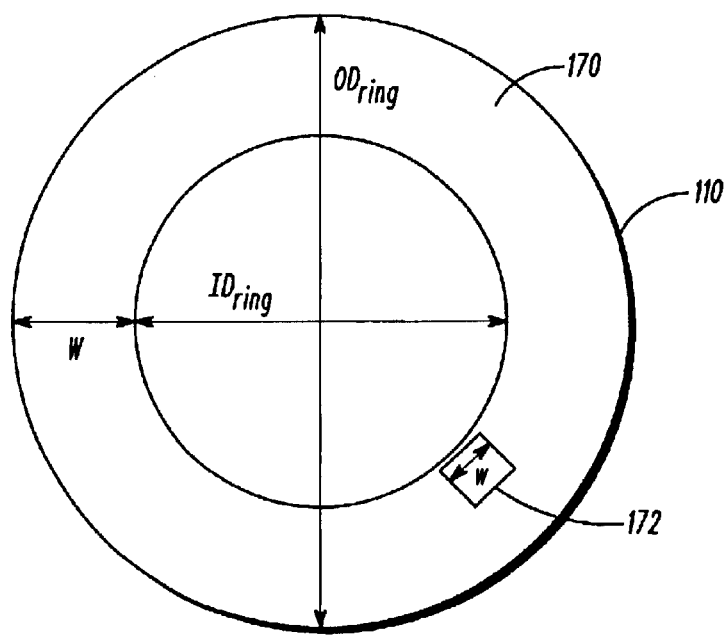
FIG. 2 shows a schematic illustration of the dimensions of components of the rotating platter of FIG. 1.

Referring firstly to FIG. 1, a first optical switch arrangement 100 includes a segmented rotating platter or disc 110 mounted on a rotating spindle 120, which is driven by a motor 130. Incoming light (for example, 140 or 150) from an individual source of an input source array 160 shines on the surface 170 of the disc 110, where the light is reflected to an element of an output array 180. Details of the disc 110 are shown in FIG. 2. The disc surface 170 contains, in its respective segments (which are arranged radially and circumferentially), multiple flat surfaces that function as individual micro-mirrors. The micro-mirrors are aligned such that the reflection of the light from one source in the array 160 of incoming light sources can be reflected to any location of the output array 180. The mirrors are fixed on the disc with regards to angle to the disc rotation axis and location (radial and circumferential). All permutations of input-to-output are sustained by the circular mirror array, but also a reduced set of permutations may be feasible depending upon the application, or a higher number of permutations may be attractive for enhancing switching times.

The mirrors on the disc may be shaped rectangular, but may also take other shapes to adjust for optimal packing of the mirrors on the disc. The topography of the individual mirrors may be flat or take a concave or convex shape, or be a free form surface. The sizes of the mirrors are adjusted to the application and vary from a size of approximately 5 $\mu m^2$ to a size of 5 $mm^2$. The reflective surface may also be a free form mirror surface.

The size of the total disc depends upon the number of required mirrors, their size, their shape, and the space requirements for putting the disc into a rotating motion. The outer diameter of the disc depends upon the mirror size, the number of inputs/outputs (I/O's) and the number of permutations desired. Each set of mirrors on a disc may be termed a configuration. Other configurations using reflective surfaces are also possible, in particular a non-flat free form surface of the disc 110 where no individual mirror is separately identified, but the reflection takes place on a designated spot on the free-form mirrored surface that is suitable for a certain permutation of optical I/O. It may be desirable for configurations to exhibit or not to exhibit symmetry by n-fold rotation, reflection or inversion, or combinations thereof.

The thickness of the disc depends upon the desired method of fabrication, and should be kept low for minimizing inertial effects. The material of the disc may be polymeric, metallic, non-metallic, ceramic, glass, or compounds thereof.

Alternatively to being rotated by the motor 130 via the spindle 140, the disc may be driven directly by a gear, or rotated using other means of activation. The motor may be manufactured separately and assembled, or may be built using the same technology as the disc.

It will be appreciated that the rotating optical switch (ROS) arrangement 100 is easier to manufacture that the MEMS optical switches referenced above, the only moving part being the platter or disc 110, which can be manufactured with known technology such as from the computer hard disk industry, in compliance with industry standards and with a long history of production knowledge.

The ROS arrangement 100 alone is suitable for switching from one input channel to multiple output channels and from multiple input channels to a single output channel and, using multiple light sources, switching from multiple input channels to multiple output channels. FIG. 2 illustrates how the dimensions of a rotating reflecting disc such as 110 (having square mirror elements 172 of width w arranged in an annular reflecting surface 170 of width W between an outer ring diameter $OD_{RING}$ and an inner ring diameter $ID_{RING}$) may be calculated according to the following equations:

$$ID_{RING}=n_{IO}*w/\pi$$

$$OD_{RING}=ID_{RING}+2*W$$

$$W=w*n_{IO}$$

where $n_{IO}$ is the number of input/output channels.

Figure 3:
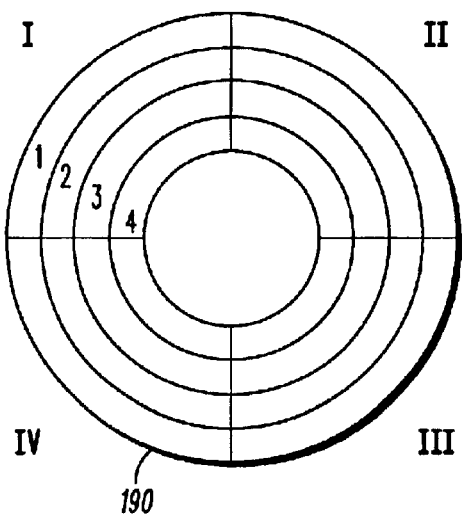
FIG. 3 shows a schematic illustration of a rotating platter, suitable for use in the optical switch arrangement of FIG. 1, having four annular portions at different radial positions, each having four angular segments.

Referring now also to FIG. 3, a rotating segmented disc 190, which may be used as an alternative to the rotating disc 110, has four 90° angular sectors (I, II, III and IV), arranged within in each of four concentric radially-spaced annular rings 1, 2, 3 and 4. It will be understood that the rings correspond respectively to input channels, with a light beam incident in a sector of any ring being reflected to an opposite sector within the same ring, from which it is reflected to an output array.

It will be understood that by using the segmented rotating reflecting disc 190 in a rotating optical switch such as the ROS arrangement 100 of FIG. 1, it is possible to switch light using any of the common multiplexing schemes (time, space, wavelength) to receiving optical devices. It will be understood that the segmentation of the platter in the ROS allows higher frequencies to be reached, the switching frequency depending upon the angular velocity of the platter, and the number of segments, as follows:

$$f=v*x_{SEGMENTS}$$

where f is the frequency v is the angular velocity, and $x_{SEGMENTS}$ is the number of segments. It will be understood that segmentation allows multiple permutations to be achieved in one platter, thus requiring only rotation as movement in the switch. It will also be understood that the segmented ROS switch may be operated in two modes: stepped rotation (in which switching is achieved by rotating a reflecting disc to a desired angular position), and continuous rotation (in which switching is achieved by timing transmission of a light beam to occur at a desired angular position of the rotating disc).

Figure 4:
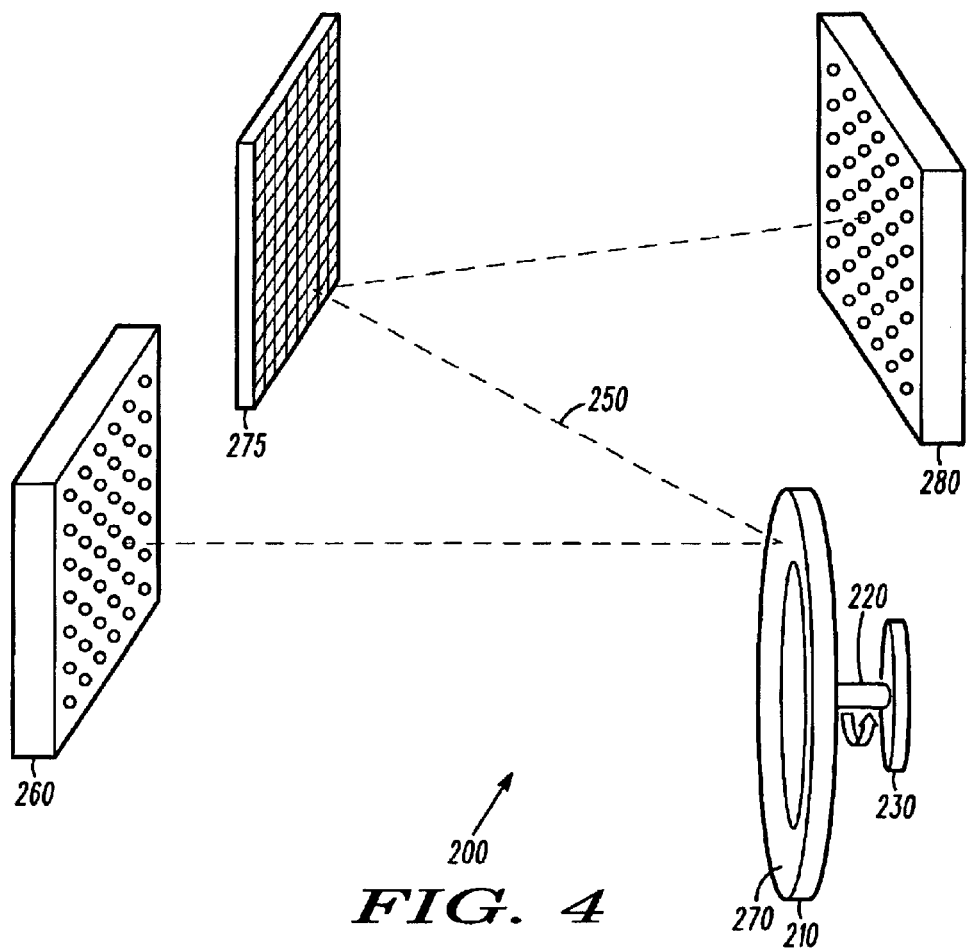
FIG. 4 shows a perspective illustration of a second optical switch arrangement utilising a rotating platter and a static optical switch matrix.

Referring now to FIG. 4, a second ROS arrangement 200 includes a segmented rotating platter or disc 210 mounted on a rotating spindle 220, which is driven by a motor 230. Incoming light 250 from an individual source of an input source matrix array 260 of light sending devices shines on the surface 270 of the disc 210, where the light is reflected to an element of a reflecting matrix array 275, where the light is reflected to an output device of an output matrix array 280 of light receiving devices. The reflecting matrix array 275 is a micro-patterned plane containing passive optical elements that are arranged such that the incoming light from the disc surface 270 can be redirected to any receiving device in the receiving device array 280.

It will be understood that the ROS arrangement 200 of FIG. 4 is a development of the ROS arrangement 100 described above with reference to FIG. 1, the addition of the reflecting matrix array 275 in the light path 250 between the input matrix 260, the ROS surface 270 and the output matrix 280 (analogous to the input matrix 160, the ROS surface 170 and the output matrix 180 in the ROS arrangement 100) providing an additional means to reduce the number of permutations required to be put onto one ROS surface 270.

The sending devices in the input matrix 260 may take a square geometry as shown, or any other geometry, such as circular or annular, with sending devices arranged in regular or irregular intervals. A sending device may be a laser diode, or any other device able to perform a similar function.

As in the ROS 110, the ROS 210 contains passive optical elements that are arranged such that the incoming light can be switched from any incoming channel to, here, the micro-patterned plane 275.

The micro-patterned plane 275 contains passive optical elements that are arranged such that the incoming light can be redirected to any receiving device in the receiving device array.

The receiving devices in the output matrix 280 may be PIN diodes or any other devices performing a similar function. The receiving device matrix may take a square geometry as shown, or any other geometry, such as circular or annular, with receiving devices arranged in regular or irregular intervals.

As with the ROS arrangement 100, the rigid switch matrix ROS arrangement 200 is a device that is easier to manufacture that the MEMS optical switches referenced above, the only moving part being the platter or disc that can be manufactured with know technology such as from the computer hard disk industry, in compliance with industry standards and with a long history of production knowledge. The rigid switch matrix 275 can be manufactured with state-of-the-art embossing techniques. The rigid switch matrix ROS arrangement 200 may be used in applications such as for different multiplexing schemes (e.g., OTDM—Optical Time Division Multiplexing, or DWDM—Dense Wavelength Division Multiplexing).

Figure 5:
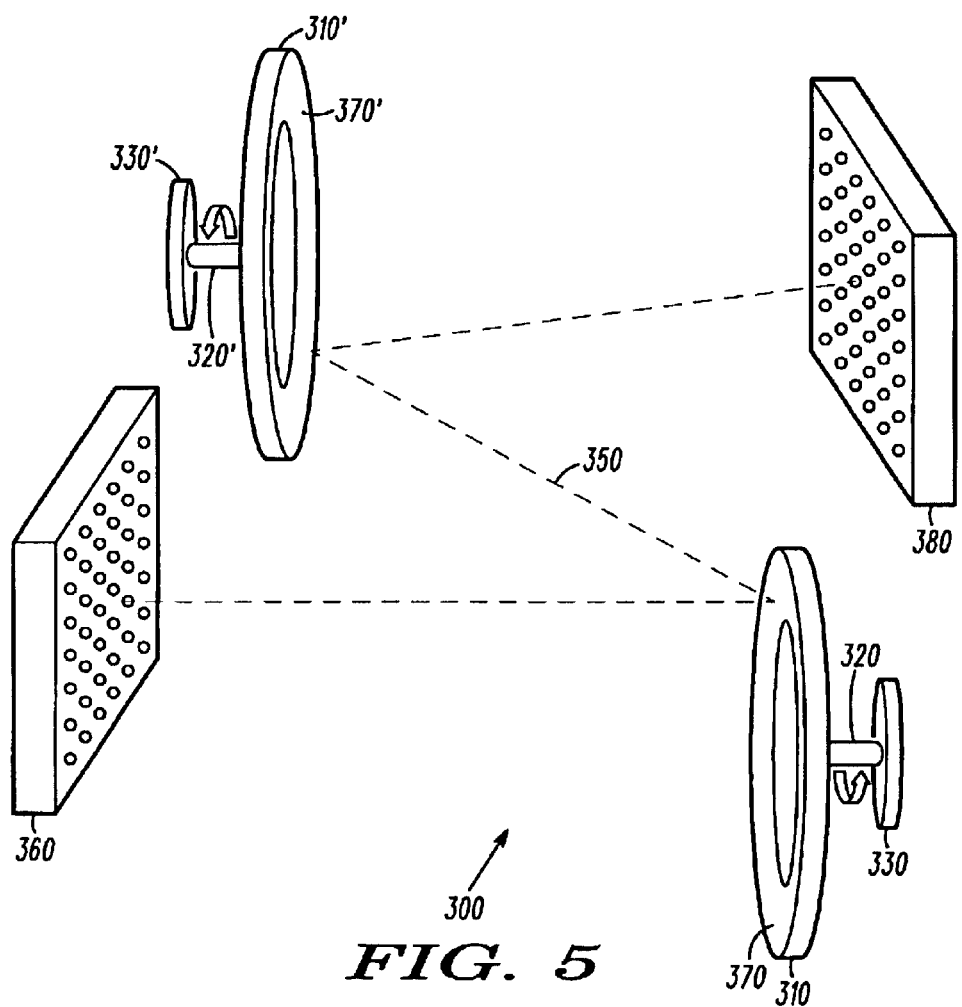
FIG. 5 shows a perspective illustration of a third optical switch arrangement utilising two rotating platters.

Referring now to FIG. 5, increased switching ability is provided by a third rotating optical switch arrangement 300.

The third ROS arrangement 300 includes a first segmented rotating platter or disc 310 mounted on a rotating spindle 320, which is driven by a motor 330. The third ROS arrangement 300 also includes a second segmented rotating platter or disc 310' mounted on a rotating spindle 320', which is driven by a motor 330'. Incoming light 350 from an individual source of an input source matrix array 360 of light sending devices shines on the surface 370 of the first disc 310, where the light is reflected to the second rotating disc 310', from whose surface 370' the light is reflected to an output device of an output matrix array 380 of light receiving devices.

Figure 7:
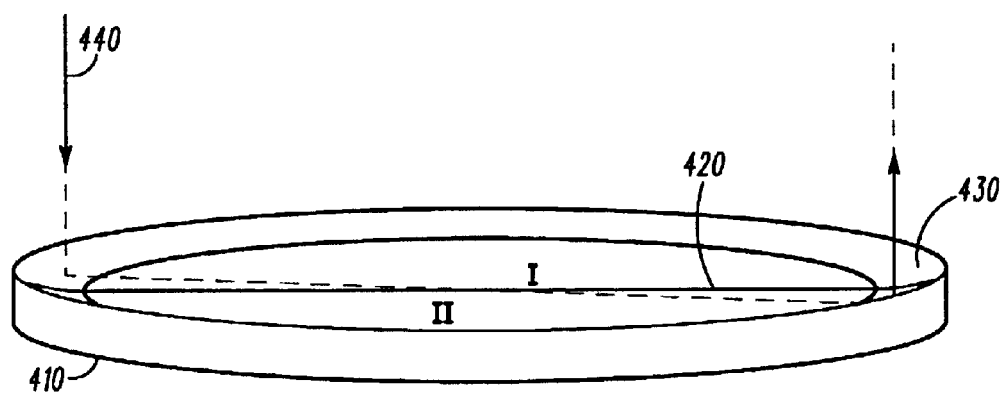
FIG. 7 shows a perspective illustration of an alternative segmented rotating platter suitable for use in the optical switch arrangement of FIG. 1, FIG. 4 or FIG. 5.

It will be understood that the third ROS arrangement 300 of FIG. 7 is a development of the ROS arrangement 100 described above with reference to FIG. 1, the addition of the ROS 310' in the light path 350 between the input matrix 360, the ROS surface 370 and the output matrix 380 (analogous to the input matrix 160, the ROS surface 170 and the output matrix 180 in the ROS arrangement 100) providing increased switching ability for light from the input array 360 to the output array 380.

Figure 6:
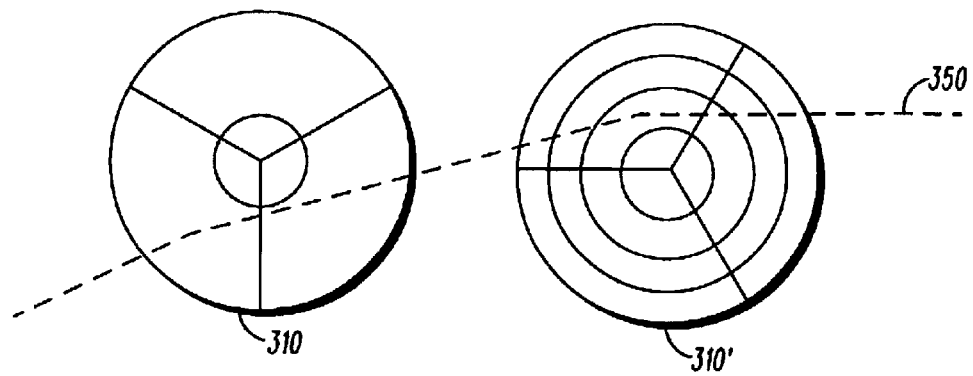
FIG. 6 shows a schematic illustration of non-identical segmentation of rotating platters of the optical switch arrangement of FIG. 5.

Referring now also to FIG. 6, the first and second rotating reflecting discs 310 and 310' are provided on their surfaces with segmented and ringed mirror arrangements as discussed above in relation to FIG. 3. The first disc 310 has three 120° segments in a single ring, and the second disc 310' has three 120° segments and three rings.

It will be understood that in operation incoming light can be reflected from a desired one of three segments on the first disc 310 to a desired one of three segments in a desired one of three rings (channels) on the second disc 310', thus providing an increased number of possible switching permutations.

It will be appreciated that the two-platter ROS 300 is a device that is easier to manufacture that the MEMS optical switches referenced above. The only moving parts are the two platters, which can be manufactured with known technology such as from the computer hard disk industry, in compliance with industry standards and with a long history of production knowledge. The ROS arrangement may find application with different multiplexing schemes such as OTDM and DWDM. It will also be appreciated that use of a second disc reduces the number of permutations that must be provided in one platter.

Referring now to FIG. 7, a rotating reflecting disc 410 allows switching of optical information at high speed, from one channel to a high number of channels.

The rotating reflecting disc 410 is enhanced by segmentation of the platter into two identical or non-identical sectors I and II.

The sectors I and II form complementary 180° halves of the platter surface and are separated by a border shown explicitly by the diametrical line 420 which subdivides the functional optical elements on the platter into at least two segments adjacent the periphery of the platter. These segments preferably are identical, but they may also exhibit non-identical behavior. The segmented platter may alternatively be a segmented ring. The disc may alternatively exhibit more than two segments.

The operating principle of the segmented disc 410 as a rotating optical switch is as follows. A light beam 440 from an input source array such as 160 is reflected at the functional optical element at the disc periphery in one segment (shown in FIG. 7 as segment I) and relayed in free-space or guided to the diametrically opposite periphery, where it is reflected at the functional optical element in the other segment (shown in FIG. 7 as segment II) to an output array such as 180.

In a variant (not shown) of the disc 410, a mirror arrangement such as a conical mirror is provided at the centre of the disc, and an incident light beam is input perpendicular to the disc surface at the centre and is reflected from the central mirror to the periphery, from which it is reflected to the output array. This variant is preferably used for, but not limited to, distribution of one incoming light beam to multiple output light beams.

It will be understood that the rotating disc mirror array arrangement and method described above provides the following advantages:

lower amount of moveable parts compared with the prior art for same number of optical I/O's high reliability due to low number of moving parts (since mirrors do not move individually, no alignment/recalibration of individual mirrors is necessary non-blocking switch (i.e., such that in any permutation all channels will be able to transmit and receive, unlike some switches that, when supporting a permutation, will block one or more input or output ports)

precision built into design.

What is claimed is:

1. A rotatable mirror optical switch arrangement comprising:

an input array of at least N light sources;

an output array of at least N light receivers; and a first rotatable platter of mirror elements arranged between the input array and the output array whereby light directly from any one of N light sources of the input array of at least N light sources is reflected via the first rotatable platter to any one of N light receivers of the output array of at least N light receivers, dependent on rotation of the first rotatable platter, wherein N is greater than 2.

2. The arrangement of claim 1 wherein the mirror elements are comprised in a free-form surface.

3. The arrangement of claim 1 further comprising rigid switch matrix means arranged such that light from the one of the N light sources of the input array of at least N light sources is reflected via the first rotatable platter and via the rigid switch matrix means to the one of the N light receivers of the output array of at least N light receivers.

4. The arrangement of claim 1 wherein the first rotatable platter comprises a segmented array of mirror elements.

5. The arrangement of claim 4 wherein the segmented array of mirror elements comprises a plurality of segments arranged in a plurality of sectors.

6. The arrangement of claim 4 wherein the segmented array of mirror elements comprises a plurality of segments arranged in a plurality of rings.

7. The arrangement of claim 1 further comprising a second rotatable platter of mirror elements arranged such that light from the one of the N light sources of the input array of at least N light sources is reflected via the first rotatable platter and via the second rotatable platter to the one of the N light receivers of the output array of at least N light receivers dependent on rotation of the first rotatable platter and the second rotatable platter.

8. The arrangement of claim 1 wherein the first rotatable platter is arranged to directly reflect therefrom light incident thereon.

9. The arrangement of claim 1 wherein the first rotatable platter is arranged to reflect light incident thereon by reflection between the mirror elements.

10. The arrangement of claim 1 wherein the size of the mirror elements is smaller than substantially 1 mm$^2$.

11. A method for rotatable mirror optical switching comprising:

reflecting light received directly from any one of N light sources of an input array of at least N light sources by a mirror element on a rotatable platter of mirror elements to any one of N light receivers of an output array of at least N light receivers dependent on rotation of the rotatable platter, wherein N is greater than 2.

12. The method of claim 11 wherein the mirror elements are comprised in a free-form surface.

13. The method of claim 11 further comprising reflecting the light reflected from the first rotatable platter by a rigid switch matrix means to the one of the N light receivers of the output array of at least N light receivers.

14. The method of claim 11 wherein the first rotatable platter comprises a segmented array of mirror elements.

15. The method of claim 14 wherein the segmented array of mirror elements comprises a plurality of segments arranged in a plurality of sectors.

16. The method of claim 14 wherein the segmented array of mirror elements comprises a plurality segments arranged in a plurality of rings.

17. The method of claim 11 further comprising reflecting the light reflected from the first rotatable platter by a second rotatable platter of mirror elements to the one of the N light receivers of the output array of at least N light receivers dependent on rotation of the first rotatable platter and the second rotatable platter.

18. The method of claim 11 wherein the first rotatable platter is arranged to directly reflect therefrom light incident thereon.

19. The method of claim 11 wherein the first rotatable platter is arranged to reflect light incident thereon by reflection between the first rotatable platter mirror elements.

20. The method of claim 11 wherein the size of the mirror elements is smaller than substantially 1 mm$^2$.

21. A rotatable mirror optical switch arrangement comprising:

an input array of at least N light sources;

an output array of light receivers; and a rotatable platter of mirror elements arranged such that a light beam directly from any one of the N light sources of the input away of at least light sources is reflected via the rotatable platter to one of the light receivers of the output array of light receivers dependent on rotation of the rotatable platter, wherein N is greater than 1 and each of the mirror elements has a linear dimension that is substantially equivalent to the corresponding linear dimension of all other mirror elements and wherein the light beam is not perpendicular to an axis of rotation of the rotatable platter.

22. The rotatable mirror optical switch arrangement according to claim 21, wherein the ratio of the corresponding linear dimensions of any two of the mirror elements is substantially less than 2 to 1.

23. A rotatable mirror optical switch arrangement comprising:

an input array of at least N light sources;

an output array of light receivers; and a rotatable platter of mirror elements arranged, such that a light beam from any one of N light sources of the input array of at least N light sources is reflected via the rotatable platter directly from one of the mirror elements to one of the light receivers of the output array of light receivers dependent on rotation of the rotatable platter, wherein N is greater than 1 and wherein the light beam is not perpendicular to an axis of rotation of the rotatable platter.

24. The arrangement of claim 23 wherein the mirror elements are comprised in a free-form surface.

25. The arrangement of claim 23 wherein the first rotatable platter comprises a segmented array of mirror elements.

26. The arrangement of claim 25 wherein the segmented array of mirror elements comprises a plurality of segments arranged in a plurality of sectors.

27. The arrangement of claim 25 wherein the segmented array of mirror elements comprises a plurality of segments arranged in a plurality of rings.

* * * * *